G. A. WOODS.
Seed-Planter.

No. 208,945. Patented Oct. 15, 1878.

WITNESSES.

J. B. Gurner
W. S. D. Haines

INVENTOR.

G. A. Woods,
per
F. A. Lehmann,
atty.

N. PETERS. PHOTO-LITHOGRAPHER, WASHINGTON, D. C.

UNITED STATES PATENT OFFICE.

GRANVILLE A. WOODS, OF DUMAS, MISSISSIPPI.

IMPROVEMENT IN SEED-PLANTERS.

Specification forming part of Letters Patent No. 208,945, dated October 15, 1878; application filed March 2, 1878.

*To all whom it may concern:*

Be it known that I, GRANVILLE A. WOODS, of Dumas, in the county of Tippah and State of Mississippi, have invented certain new and useful Improvements in Seed-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in seed-planters; and it consists in the arrangement and combination of parts whereby the ground is first harrowed, the furrow opened, the seed deposited therein, and then covered as the machine moves along, as will be more fully described hereinafter.

The accompanying drawings represent my invention.

Figure 1:
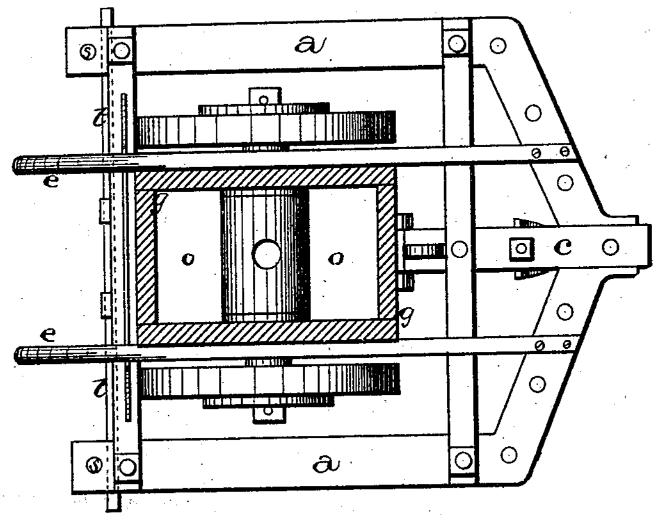
Figure 2:
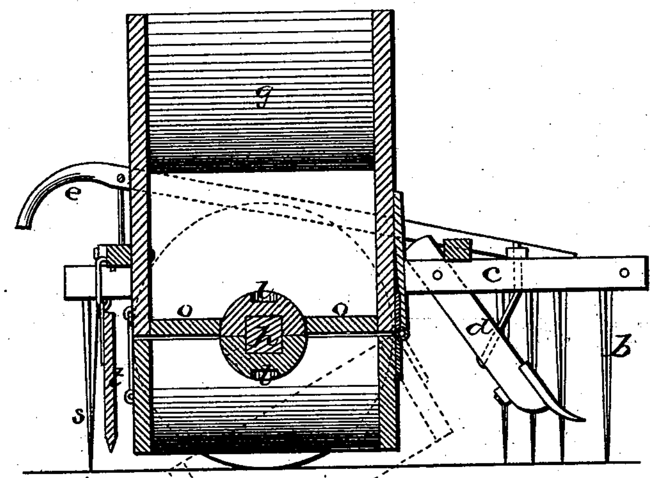
Figure 4:
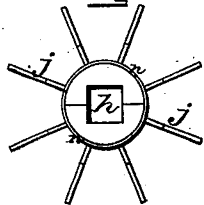
Figure 3:
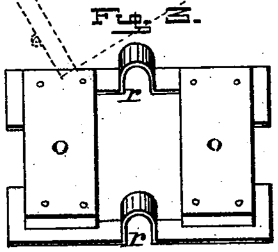
Figure 5:
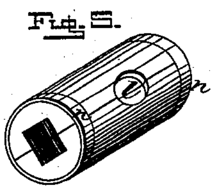

Figure 1 is a plan view of my improved seed-planter. Fig. 2 is a longitudinal section of the same; and Figs. 3, 4, and 5 are detailed views of parts thereof.

*a* represents a frame, preferably made of the shape herein shown, and which has the harrow-teeth *b* projecting downward from its front end, so as to harrow the ground and thus prepare it for the planting of seed before any other operation. Fastened between the front ends of the frame and to the front side of the hopper is a suitable beam, *c*, up through which passes the standard *d*, having a suitably-shaped shovel upon its lower end to open the furrow for the seed to drop in.

Projecting backwardly from the front end of the frame are the two handles, which are rigidly braced in position by means of the rod or bar *e*, and in between these handles is secured the seed-box *g*, as shown. The lower portion of this seed-box is hinged to the front end, and opens downward so as to allow the shaft *h*, upon which the driving-wheels and the stirrer or seed-cups are placed, to be inserted. As the whole rear end of the frame is supported entirely upon these driving-wheels, as the machine moves forward the shaft is made to revolve and thus to operate the stirrer *j*, for the purpose of forcing cotton-seed out through the slot in the bottom of the hinged portion, or when used for planting seed, for dropping the seed at regular intervals by means of the seed-cups *l*.

These seed-cups *l* and stirrer *j* are each made in two parts, and after they have been placed upon the square central portion of the shaft the rings *n* are passed around their ends, so as to keep them in position. When it is desired to plant seed, the stirrer *j* is removed from the shaft, the seed-cups *l* fastened in position, and then, before the shaft is again inserted in position under the seed-box, the frame, composed of the two strips of board *o* and the two thin metallic binding-plates *r*, is inserted into the bottom of the hopper, and then the shaft is inserted into position, the lower part of the hopper closed upward, and the machine is ready for planting corn or other similar seed. The seed-cups are just large enough to fill the whole of the space between the two strips of board *o*, so that no part of the seed can escape from the seed-box except what is discharged from the seed-cup. It will be noticed that the two strips of board *o* fit just inside of the seed-box, and that the metallic binding-pieces rest between the rigid and the hinged portion of the seed-box, the plates being turned upward at their centers so as to form recesses for the shaft to turn in. When thus placed in position the metallic connecting-plates serve to prevent the shaft wearing away the wood-work of the seed-box.

From each corner of the rear end of the frame projects a harrow-tooth, *s*, which teeth serve as stops to prevent the covering-board *t* from moving too far backward, as well as to help to harrow the ground.

It will be noticed that the ground is first harrowed so as to prepare it for the seed, the furrow is opened, the seed is dropped, and then the seed is covered as the machine moves forward. By making the bottom of the seed-box in two parts and having one part to swing downward, the stirrer *j* can be removed at will, the seed-cups inserted, and thus the machine be converted from one kind of planter to another.

Having thus described my invention, I claim—

The combination, in a seed-planter, of the hopper *g*, made in two parts, as described, the lower part being hinged to the upper part, the boards *o o*, with centrally looped or arched connecting-strips *r r*, the shaft *h*, and the semi-cylindrical seed-cups *l l*, placed around the shaft and connected together by the rings *n n*, all substantially as and for the purposes herein set forth.

In testimony that I claim the foregoing I have hereunto set my hand this 16th day of February, 1878.

GRANVILLE ALEXANDER WOODS.

Witnesses:

JOHN A. STOKES,
J. J. PLUMMER.